(12) United States Patent
Lee

(10) Patent No.: US 6,442,889 B1
(45) Date of Patent: *Sep. 3, 2002

(54) INSECT AND ANIMAL TRAPS AND HOLDER FOR SAME

(76) Inventor: Elliot W. Lee, 1032 Tustin Pines Way, Tustin, CA (US) 92780-2858

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 96 days.

(21) Appl. No.: 09/175,570

(22) Filed: Oct. 20, 1998

(51) Int. Cl.⁷ .............................. A01M 1/14; A01M 1/10
(52) U.S. Cl. ........................................... 43/114; 43/121
(58) Field of Search .......................... 43/107, 114, 121, 43/132.1; 220/507, 553, 555, 23.4; 211/126.2, 126.3, 126.1, 126.16

(56) References Cited

U.S. PATENT DOCUMENTS

| | | | | |
|---|---|---|---|---|
| 1,218,406 A | * | 3/1917 | Jackson ........................... | 43/81 |
| 1,293,894 A | * | 2/1919 | Ollier ............................. | 43/61 |
| 1,792,774 A | * | 2/1931 | Snider ........................... | 43/81 |
| 1,808,903 A | * | 6/1931 | Nelson ........................... | 43/81 |
| 2,962,836 A | * | 12/1960 | Hughes ......................... | 43/114 |
| 3,545,623 A | * | 12/1970 | Andreasson ............. | 211/126.3 |
| 3,581,429 A | | 6/1971 | Hickman ..................... | 43/107 |
| 3,685,199 A | | 8/1972 | Bradshaw ..................... | 43/114 |
| 3,802,116 A | | 4/1974 | Meguro et al. ............... | 43/121 |
| 3,816,956 A | | 6/1974 | Sekula ........................... | 43/114 |
| 3,851,417 A | | 12/1974 | Wunsche ..................... | 43/121 |
| 3,851,938 A | * | 12/1974 | McCowan et al. ....... | 211/126.1 |
| 3,908,302 A | | 9/1975 | Carr .............................. | 43/121 |
| 3,940,874 A | | 3/1976 | Katsuda ....................... | 43/114 |
| 3,968,590 A | * | 7/1976 | Kitterman ................... | 43/114 |
| 4,030,233 A | | 6/1977 | Wunsche ..................... | 43/121 |
| 4,044,495 A | | 8/1977 | Mishimura et al. .......... | 43/121 |
| 4,048,747 A | | 9/1977 | Shanahan et al. ............. | 43/114 |
| 4,074,456 A | | 2/1978 | Tidwell ......................... | 43/98 |
| 4,161,079 A | * | 7/1979 | Hill ............................... | 43/114 |
| 4,208,828 A | | 6/1980 | Hall et al. ..................... | 43/114 |
| 4,214,400 A | | 7/1980 | Patmore et al. ............... | 43/121 |
| 4,217,722 A | * | 8/1980 | McMullen ..................... | 43/114 |
| 4,263,740 A | | 4/1981 | Hemsarth et al. ............. | 43/114 |
| 4,275,943 A | * | 6/1981 | Gelardi et al. ............. | 220/23.4 |
| 4,316,344 A | | 2/1982 | Carlsen ......................... | 43/114 |
| 4,395,842 A | | 8/1983 | Margulies ..................... | 43/114 |
| 4,400,905 A | | 8/1983 | Brown ....................... | 43/132.1 |
| 4,462,182 A | * | 7/1984 | French ......................... | 43/131 |
| 4,608,774 A | | 9/1986 | Sherman ....................... | 43/114 |
| 4,676,022 A | | 6/1987 | Wraight ........................ | 43/121 |
| 4,696,127 A | | 9/1987 | Dobbs ........................... | 43/121 |
| 4,709,503 A | * | 12/1987 | McQueen ..................... | 43/114 |
| 4,709,504 A | | 12/1987 | Andric ......................... | 43/114 |
| 4,761,912 A | * | 8/1988 | Dyer et al. ................... | 43/121 |

(List continued on next page.)

OTHER PUBLICATIONS

"Cooper Mill, Ltd." Website, http://www.coopermill.com/indust.html, Oct. 27, 1997.
"Combo Mouse and Insect Trap Makes Hands–Free Disposal An Easy Proposition" Date Unknown.

*Primary Examiner*—Darren W. Ark
(74) *Attorney, Agent, or Firm*—Robert Platt Bell

(57) ABSTRACT

The present invention solves the problems of the prior art by providing a holder to arrange a plurality of roach traps in parallel to form a barrier to the path of the roaches. Roach migration patterns may be readily observed or predicted. Typical pathways include under doorways, near pipe entries, and near sources of water. Placed in the path of the roaches, the plurality of roach traps force a roach to traverse through one of the traps, where it is ensnared. The trap holder may be provided with a attachment point so that multiple holders may be arranged in series to form larger barriers. Individual roach traps, either of the prior art design, or of a specialized design disclosed herein, may be used with the roach trap holder. As individual traps are filled, they may be removed one at a time without having to replace the entire traps and trap holder combination.

7 Claims, 10 Drawing Sheets

U.S. PATENT DOCUMENTS

| | | | |
|---|---|---|---|
| 4,815,231 A | | 3/1989 | McQueen .................... 43/114 |
| 4,884,713 A | * | 12/1989 | Handler ..................... 220/23.4 |
| 4,889,254 A | * | 12/1989 | Vola ......................... 220/23.4 |
| 5,115,916 A | * | 5/1992 | Beasley et al. ............ 220/23.4 |
| 5,157,866 A | * | 10/1992 | Rosie ......................... 43/121 |
| 5,310,071 A | * | 5/1994 | Rivlin et al. ............... 220/23.4 |
| 5,310,552 A | * | 5/1994 | Gunner et al. ................ 43/121 |
| 5,325,625 A | | 7/1994 | Liu et al. ..................... 43/114 |
| 5,396,729 A | * | 3/1995 | Vejvoda ...................... 43/114 |
| 5,438,792 A | | 8/1995 | Monett et al. ................ 43/114 |
| 5,454,186 A | | 10/1995 | Gang .......................... 43/114 |
| 5,572,825 A | | 11/1996 | Gehret ........................ 43/114 |
| 5,588,250 A | | 12/1996 | Chiba ......................... 43/114 |
| 5,649,385 A | | 7/1997 | Acevedo ..................... 43/114 |
| 5,713,153 A | * | 2/1998 | Cook et al. .................. 43/114 |
| 5,890,613 A | * | 4/1999 | Williams .................. 220/23.4 |
| 5,930,944 A | * | 8/1999 | Knuppel ..................... 43/114 |
| 5,950,353 A | * | 9/1999 | Johnson et al. ............... 43/114 |

* cited by examiner

INSECT AND ANIMAL TRAPS AND HOLDER FOR SAME

FIELD OF THE INVENTION

The present invention relates to the filed or insect and small animal traps, in particular, adhesive-type traps for catching rodents and insects, particularly cockroaches.

BACKGROUND OF THE INVENTION

Adhesive traps are well known in the art, dating back decades, if not centuries, to the early uses of sticky substances and flypapers to catch insects and the like. Modern adhesive traps may be embodied in what is commercially sold as the ROACH MOTEL™, a box-like member provided with glue or adhesive inside to catch roaches.

Gehret, U.S. Pat. No. 5,572,825, issued Nov. 12, 1996, and incorporated herein by reference, discloses an example of such a glue-type trap. FIG. 1 is a perspective view of such a trap. Trap 1 comprises a housing 14 made of cardboard or the like. Trap 1 may be provided with a one or more of openings 2 allowing a roach to enter. Inside, an adhesive 3 may be provided on the floor or other surface of the trap to ensnare the roach. A chemical attractant may be used to lure the roach into the trap.

The present inventor has discovered, through extensive research, that such traps suffer from a fundamental flaw. Namely, they require the roach to seek out and enter the trap. If the roach does not find the trap, the roach will not become ensnared. Moreover, attractants may be of limited use in attracting roaches, as they may be more attracted to actual food debris, and especially, water.

Wraight, U.S. Pat. No. 4,676,022, issued Jun. 30, 1987, and incorporated herein by reference, discloses a rotatable insect trap device. A holder on a want holds two convention roach traps. A user may place the roach traps in the path of a roach in order to capture the roach. While such a device may be useful when roaches are seen, most roaches avoid daylight, preferring to come out at night. Moreover, having to move the traps by hand and predicting the path of a loose roach may be somewhat difficult. The trap requires active, not passive, use.

Gang, U.S. Pat. No. 5,454,186, issued Oct. 3, 1995, and incorporated herein by reference, discloses an insect trap kit. In the primary embodiment, this kit may be assembled to build a multiple entrance roach trap. Such a trap may increase the likelihood that a roach may be ensnared by presenting a larger and multiple entrance area. However, once roaches are ensnared, the entire trap must be disposed of (or the user must live with unsanitary dead and dying roaches in the trap. Disposing of such traps may be expensive and time consuming.

Thus, it remains a requirement in the art to provide a roach trap which eliminates or reduces the need for the roach to seek out, locate, and enter the trap.

Moreover, it remains a requirement in the art to provide a trap which is less dependent upon attractants to ensnare roaches.

It also remains a requirement in the art to provide a roach trap which allows only those portions thereof ensnaring roaches to be disposed of.

SUMMARY OF THE INVENTION

The present invention solves the problems of the prior art by providing a holder to arrange a plurality of roach traps in parallel to form a barrier to the path of the roaches. Roach migration patterns may be readily observed or predicted. Typical pathways include under doorways, near pipe entries, and near sources of water.

Placed in the path of the roaches, the plurality of roach traps force a roach to traverse through one of the traps, where it is ensnared. The trap holder may be provided with a attachment point so that multiple holders may be arranged in series to form larger barriers.

Individual roach traps, either of the prior art design, or of a specialized design disclosed herein, may be used with the roach trap holder. As individual traps are filled, they may be removed one at a time without having to replace the entire traps and trap holder combination.

BRIEF DESCRIPTIONS OF THE DRAWINGS

DETAILED DESCRIPTION OF THE INVENTION

Figure 1:
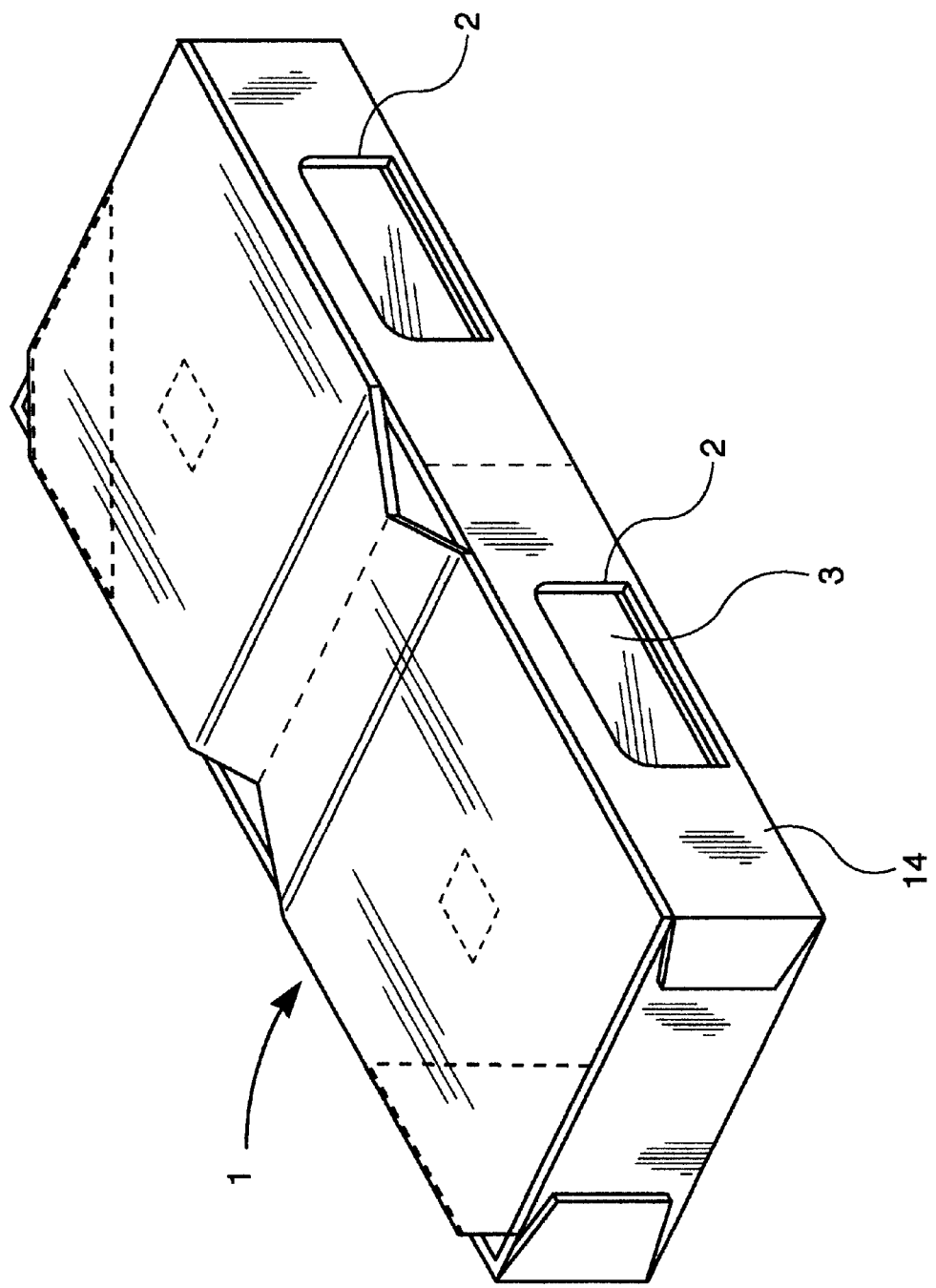
FIG. 1 is a perspective view of a prior art adhesive trap.
Figure 2:
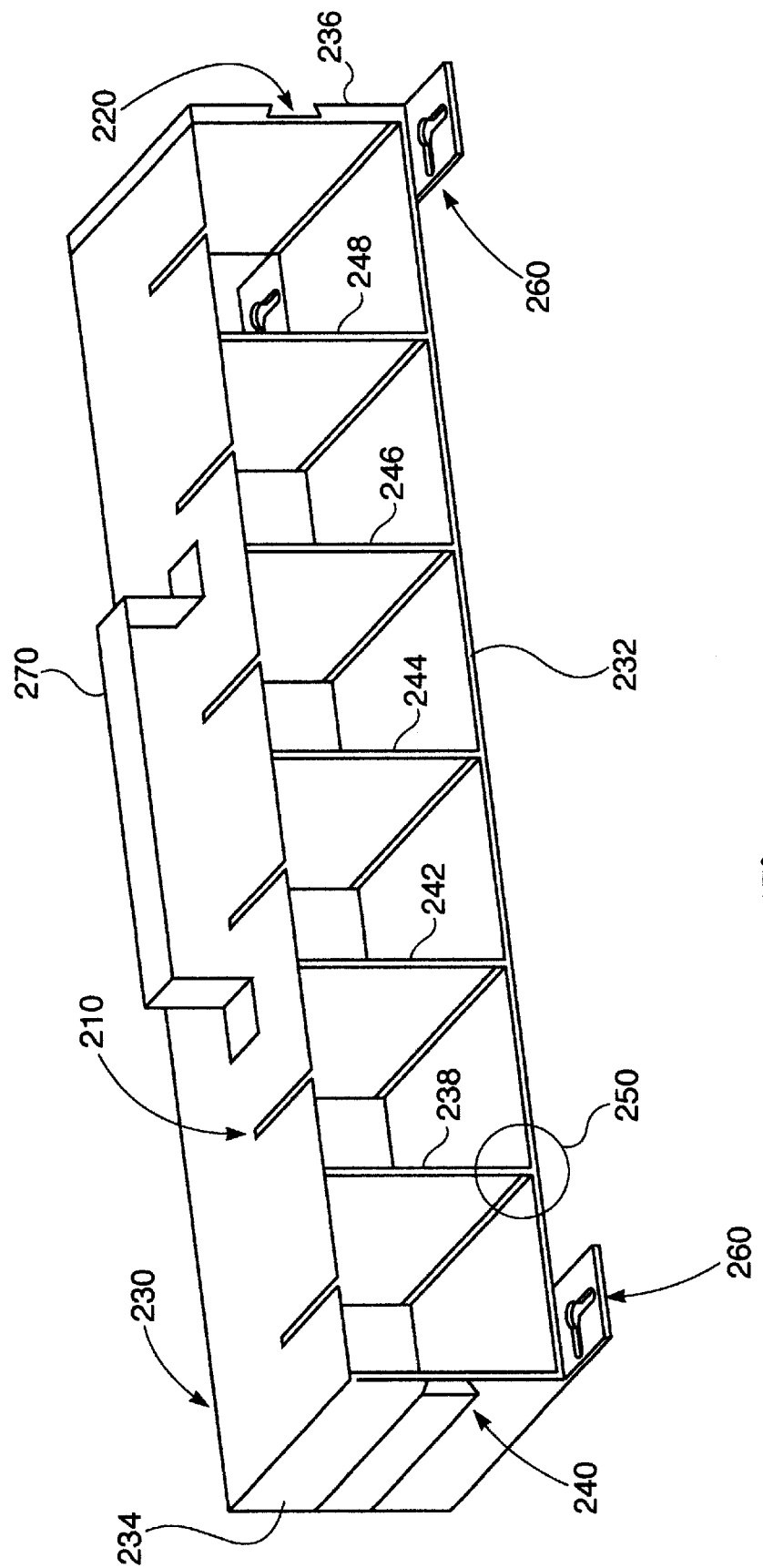
FIG. 2 is a perspective view of a first embodiment of the roach trap holder of the present invention.

FIG. 2 is a perspective view of a first embodiment of the roach trap holder of the present invention. The trap holder of FIG. 2 may comprise a housing having planar top member 230, bottom member 232, and side members 234 and 236. A plurality of vertical members 238, 242, 244, 246, and 248 may divide the housing into a plurality of compartments. Note that in the embodiment of FIG. 2, six compartments are shown. However, other numbers of compartments may be used without departing from the spirit and scope of the present invention.

In use, individual roach traps may be inserted into the compartments formed by dividing walls 238, 242, 244, 246, and 248 to form a wall or barrier of roach traps. Plural numbers of trap holders may be joined together using male dovetail joint 240 and female dovetail joint 220 to form a longer trap holder and thus longer barrier. The trap holder may be placed in an area known to be or suspected to be a pathway for roaches (e.g., under doors, near pipe entries, kitchen floors, countertops, or the like).

Roaches, when confronting such a wall of traps, must pass through one of the traps or turn back. Unlike prior art roach traps, which require the roach to seek out the trap, the trap holder of the present invention provides a wall of traps forming an insurmountable barrier to the roach such that the roach must pass through the trap. Thus, the use of baits, which may in any event be ineffective, may be eliminated or reduced, as no lure may be required. Moreover, unlike single roach traps, the trap holder of the present invention may trap roaches en masse, thus seriously reducing or eliminating a roach population.

Various ancillary features amy be provided in the roach trap holder of the present invention. Handle 270 may be provided to allow the holder to be moved and manipulated without touching the trap portions. Such a handle may make the trap more attractive to some users (e.g., housewives or the like) who may be revolted by the prospect of handling roach traps. In addition, such a handle may reduce the presence of any human scent on the trap which may discourage or repel roaches.

Mounting brackets 260 may be provided to mount the trap holder on a horizontal or vertical surface. Such a trap holder may be effective when used near pipe openings in walls. Mounting brackets 260 may also allow the trap holder to be mounted in such a vertical position. Other types of mounting, including hook-and-loop fasteners (e.g., VEL-CRO® brand hook-and-loop fastener or the like) may be used to mount the trap holder on walls or even ceilings. Similarly, such hook-and-loop fasteners amy be used to join adjacent traps together.

Once roaches are trapped, individual traps may be removed and disposed of in the conventional manner. Individual traps may comprise, for example, the well-known ROACH MOTEL™ trap known in the art may be inserted into the compartments formed by dividing walls 238, 242, 244, 246, and 248 which may be sized accordingly. Alternately, the apparatus may be sized to accommodate a specially designed trap, or may be designed to accommodate a number of different trap types, including prior art traps.

Figure 3:
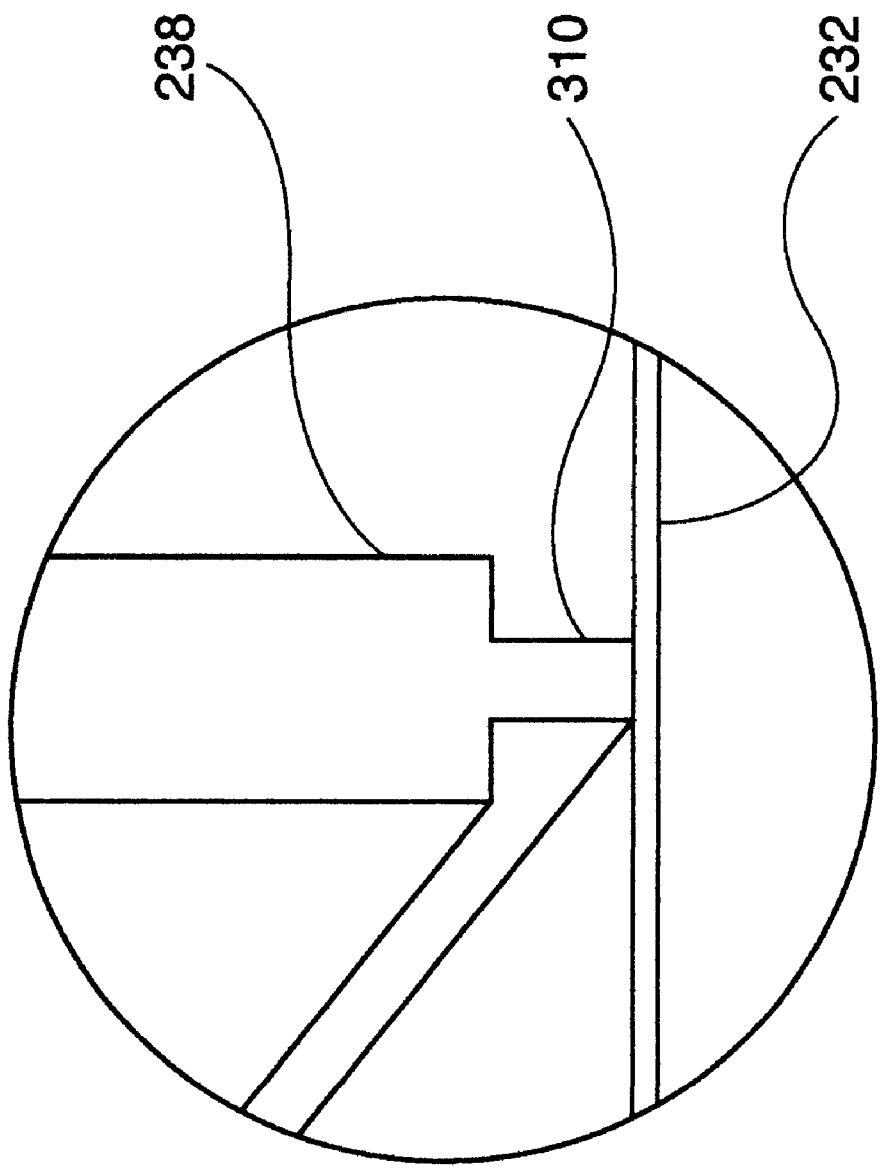
FIG. 3 is an enlarged view of portion 250 of FIG. 2.
Figure 4:
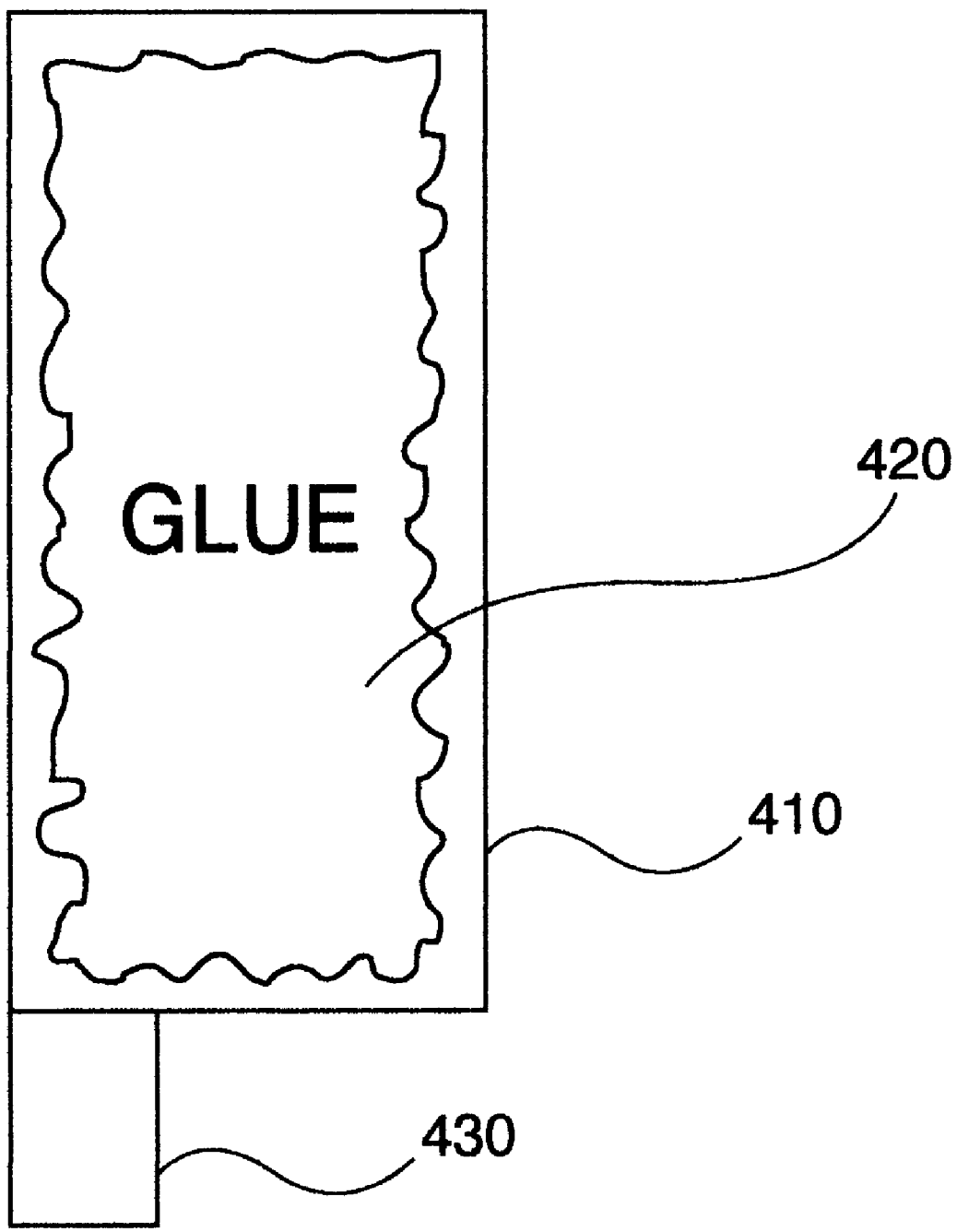
FIG. 4 is a top view of one embodiment of a trap for use with the trap holder of FIG. 2.

FIG. 3 is an enlargement of groove 250 illustrated in FIG. 2. Groove 250 may be provided to accept a planar trap illustrated in FIG. 4. FIG. 4 is a top view of one embodiment of a trap for use with the trap holder of FIG. 2. The trap of FIG. 4 may comprise a planar surface 410 made of cardboard or the like, provided with an adhesive coating 420 on one side thereof. Adhesive coating 420 may extend substantially to the edges of planar surface 410. A tab 430 may be provided to allow the trap of FIG. 4 to be handled without having to contact adhesive 420 or dead roaches.

In use, the trap of FIG. 4 may be slid into one or more of the compartments formed by dividing walls 238, 242, 244, 246, and 248 which may be sized accordingly. Groove 310 may serve to hold the trap of FIG. 4 into place. As may be readily appreciated, the trap of FIG. 4 may be more economical to produce than conventional adhesive traps, as no covering portion may be required.

For commercial use, the trap of FIG. 4 may be easily and economically produced. A release film (not shown) may be applied to the trap of FIG. 4 to prevent the adhesive from sticking or drying out in storage and transit. When the trap of FIG. 4 is to be inserted into the holder of FIG. 3, such a release film may then be removed. Note that the trap holder of FIG. 2 may thus be configured to hold both conventional style traps (e.g., ROACH MOTEL™ or the like) and the simplified trap of FIG. 4.

Figure 5:
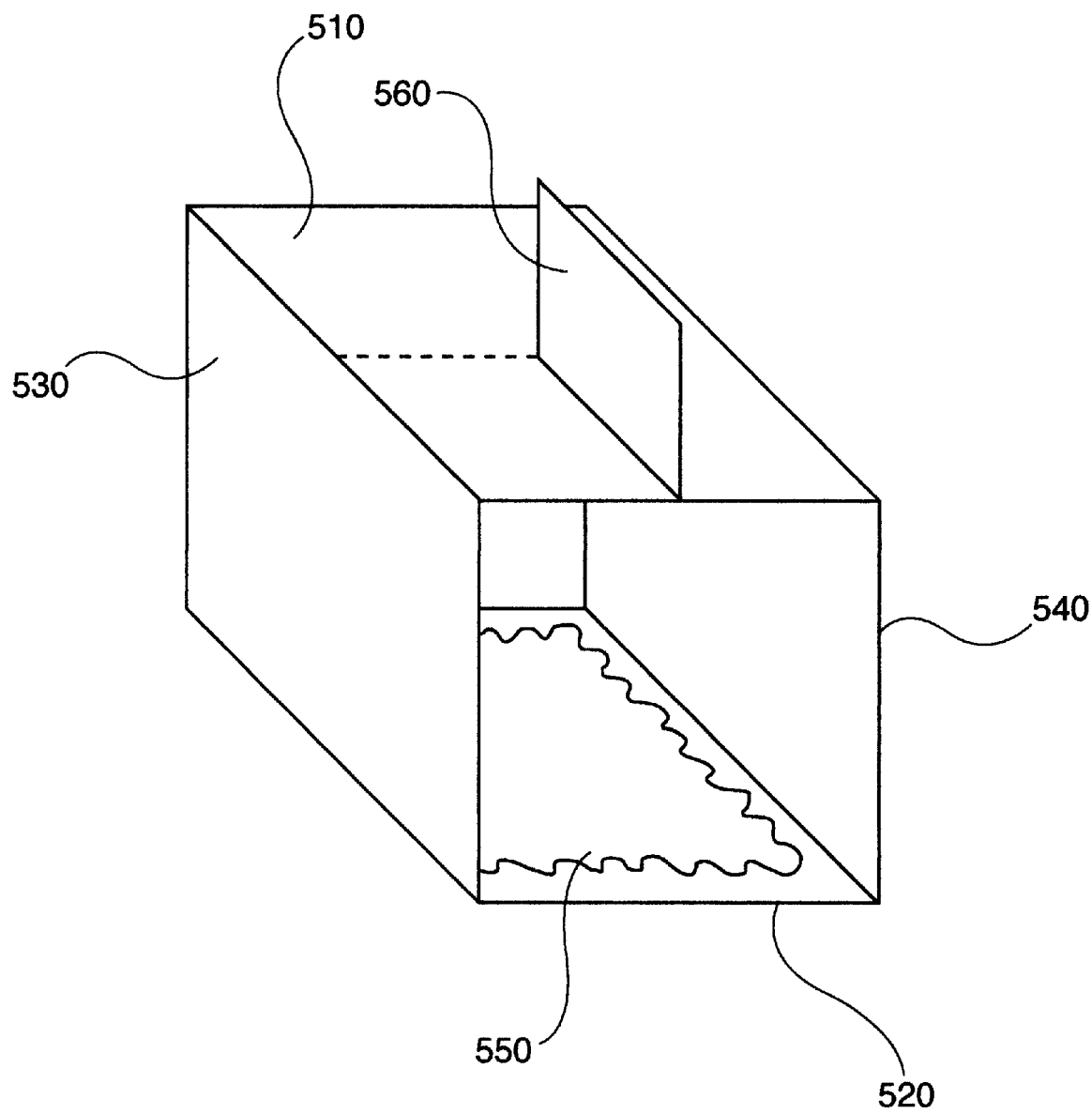
FIG. 5 is a perspective view of a second embodiment of a trap for use with the trap holder of FIG. 2.

FIG. 5 is a perspective view of a second embodiment of a trap for use with the trap holder of FIG. 2. The trap of FIG. 5 may comprise top and bottom planar members 510 and 520, respectively, which, along with side members 530 and 540 form an enclosure. Top and bottom planar members 510 and 520, and side members 530 and 540 may be formed of cardboard or the like. Adhesive 550 may be provided on an inside surface of bottom member 520, or, in the alternative, may be provided on any or all of top planar member 510 and side members 530 and 540.

On top planar member 510, a tab 560 may be provided to holding the trap of FIG. 5. Such a tab may be formed as a perforated portion of top member 510, which may be singled or double-walled cardboard. Tab 560 allows the trap of FIG. 5 to be handled without having to put ones hands in close proximity to the dead cockroaches, or risk leaving a human smell on the trap. Moreover, tab 560 may slide into slot 210 of the trap holder of FIG. 2 to help secure the trap to the trap holder. Slot 210 allows tab 560 to be readily gripped by a user.

Figure 6:
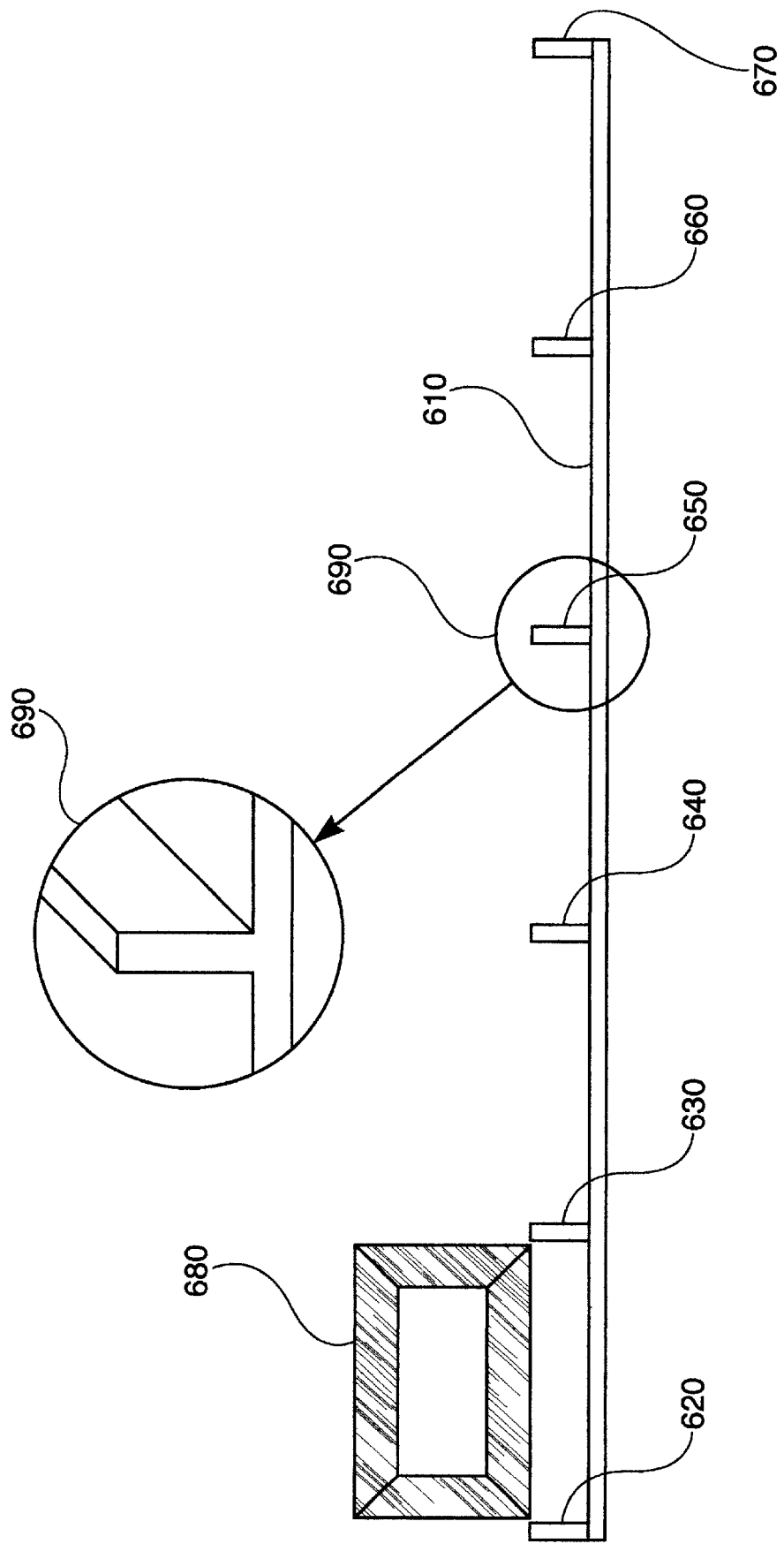
FIG. 6 is a front view of a second embodiment of the trap holder of the present invention.

FIG. 6 is a front view of a second embodiment of the trap holder of the present invention. In the holder of FIG. 6, box-types traps such as that illustrated in FIG. 5 or prior art traps (e.g., ROACH MOTEL™ or the like) may be used. A planar member 610 is provided with a plurality of stanchion 620, 630, 640, 650, 660, and 670 for gripping and holding traps 680. The locations of stanchion 620, 630, 640, 650, 660, and 670 may be such that a slight interference fit is achieved so that trap 680 will slid into place with a friction fit. Enlarged portion 690 illustrates the details of stanchion 620, 630, 640, 650, 660, and 670.

The holder of FIG. 6 may be much less expensive than the apparatus of FIG. 2, and thus may be attractive for use in commercial applications of the like.

Figure 7:
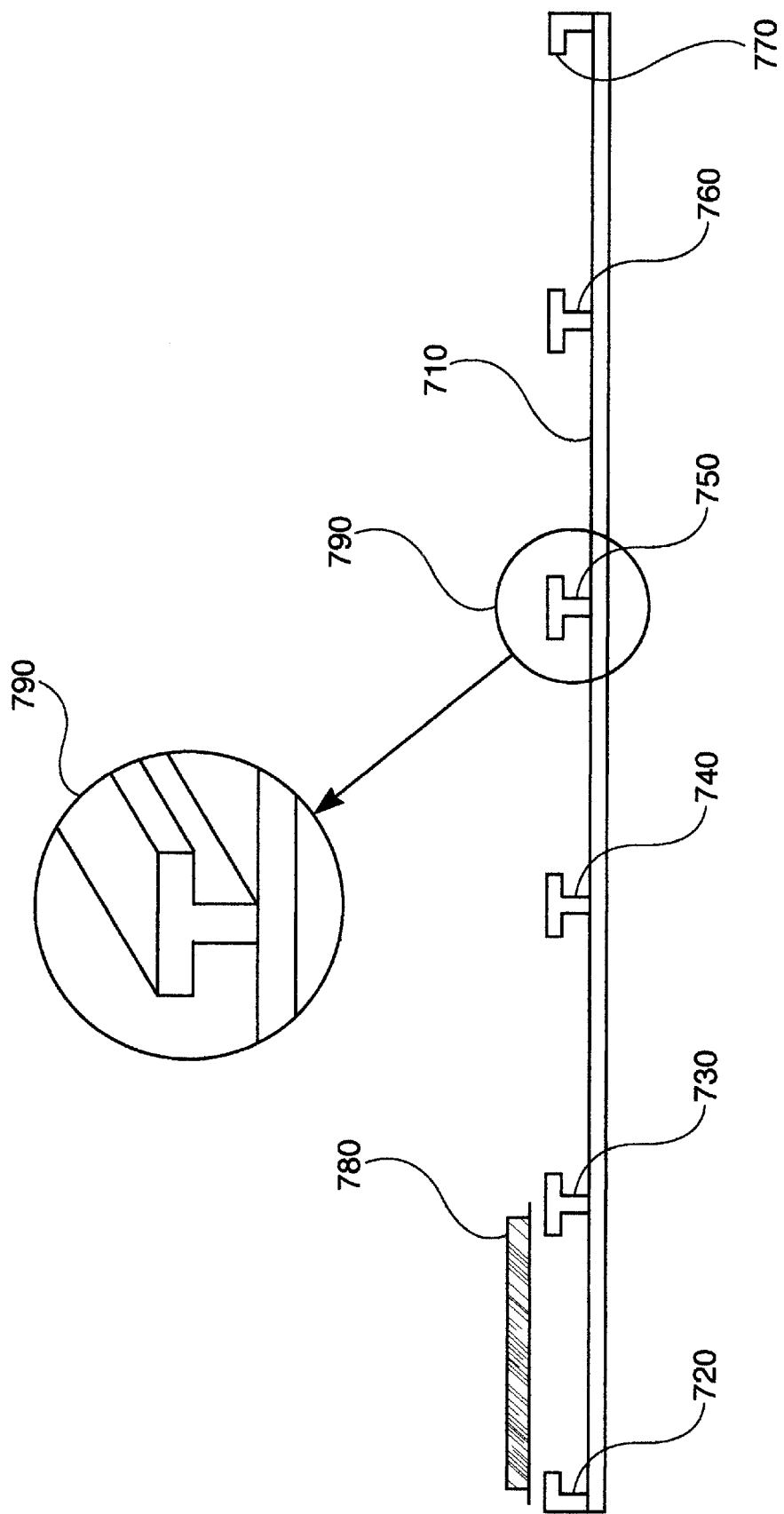
FIG. 7 is front view of a third embodiment of the trap holder of the present invention.

FIG. 7 is front view of a third embodiment of the trap holder of the present invention. In the embodiment of FIG. 7, stanchion 720, 730, 740, 750, 760, and 770 may be designed with a slot, as illustrated in enlarged portion 790 so as to grip a card-type trap 780 such as that illustrated in FIG. 3. The embodiment of FIG. 7, like that of FIG. 6, may be less expensive than the apparatus of FIG. 2, and thus may be attractive for use in commercial applications of the like.

Figure 8:
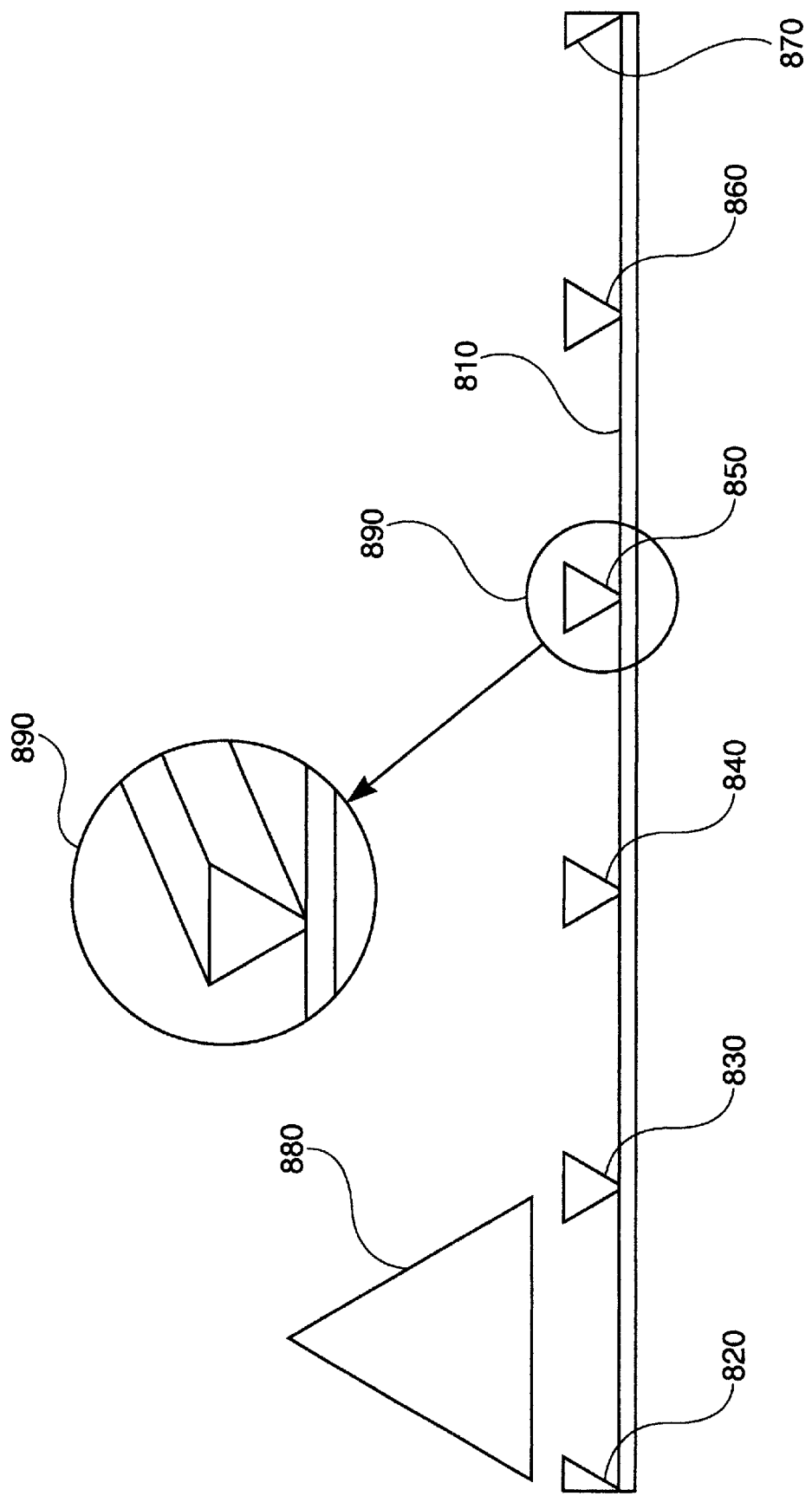
FIG. 8 is a front view of a fourth embodiment of the trap holder of the present invention.

FIG. 8 is a front view of a fourth embodiment of the trap holder of the present invention. The embodiment of FIG. 8 may be utilized for triangular traps known in the art similar to that as illustrated in Nishimura et al., U.S. Pat. No. 4,044,495 issued Aug. 30, 1997 and incorporated herein by reference.

In the embodiment of FIG. 8, stanchion 820, 830, 840, 850, 860, and 870 may be designed as inverted triangles, as illustrated in enlarged portion 890 so as to grip a triangular-shaped trap 880. The embodiment of FIG. 8, like that of FIGS. 6 and 7, may be less expensive than the apparatus of FIG. 2, and may be implemented with commercially available roach traps.

Figure 9:
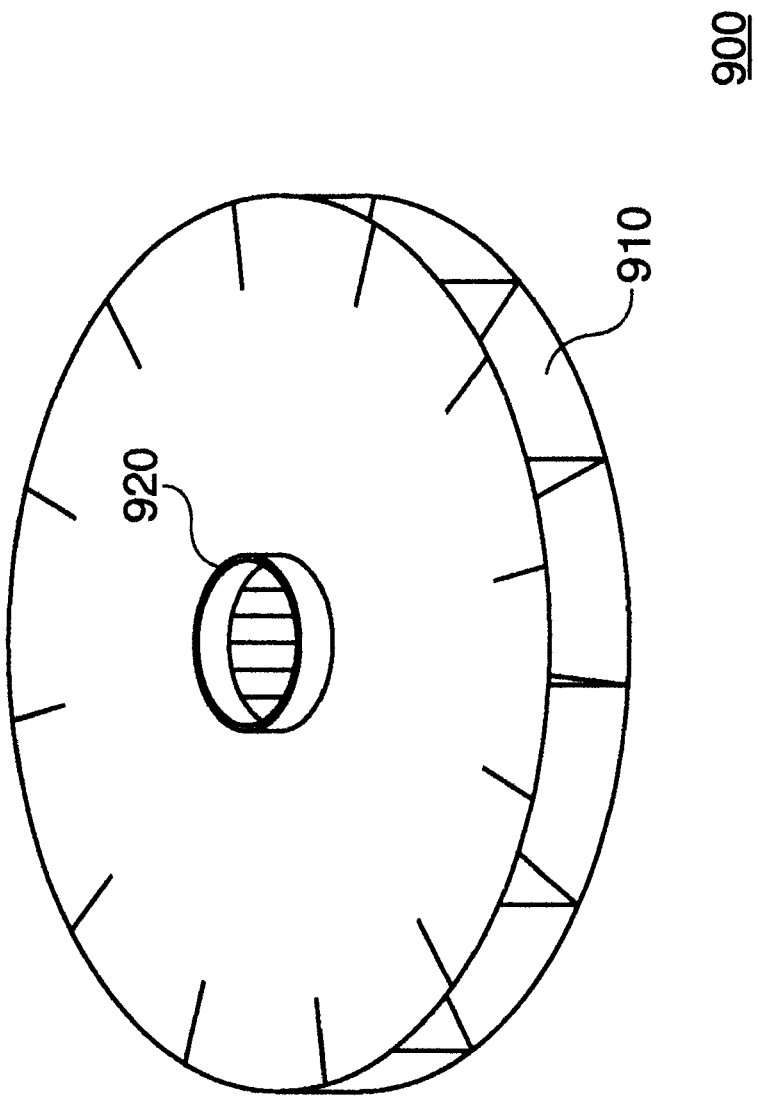
FIG. 9 is a perspective view of a fifth embodiment of the trap holder of the present invention.

FIG. 9 is a perspective view of a fifth embodiment of the trap holder of the present invention. In the embodiment of FIG. 9, roach trap holder 900 may be configured in a circular embodiment. Individual roach traps may be formed into wedge or pie-shaped "slices" which may be inserted into corresponding openings (e.g., 910) in roach trap holder 900.

Figure 10:
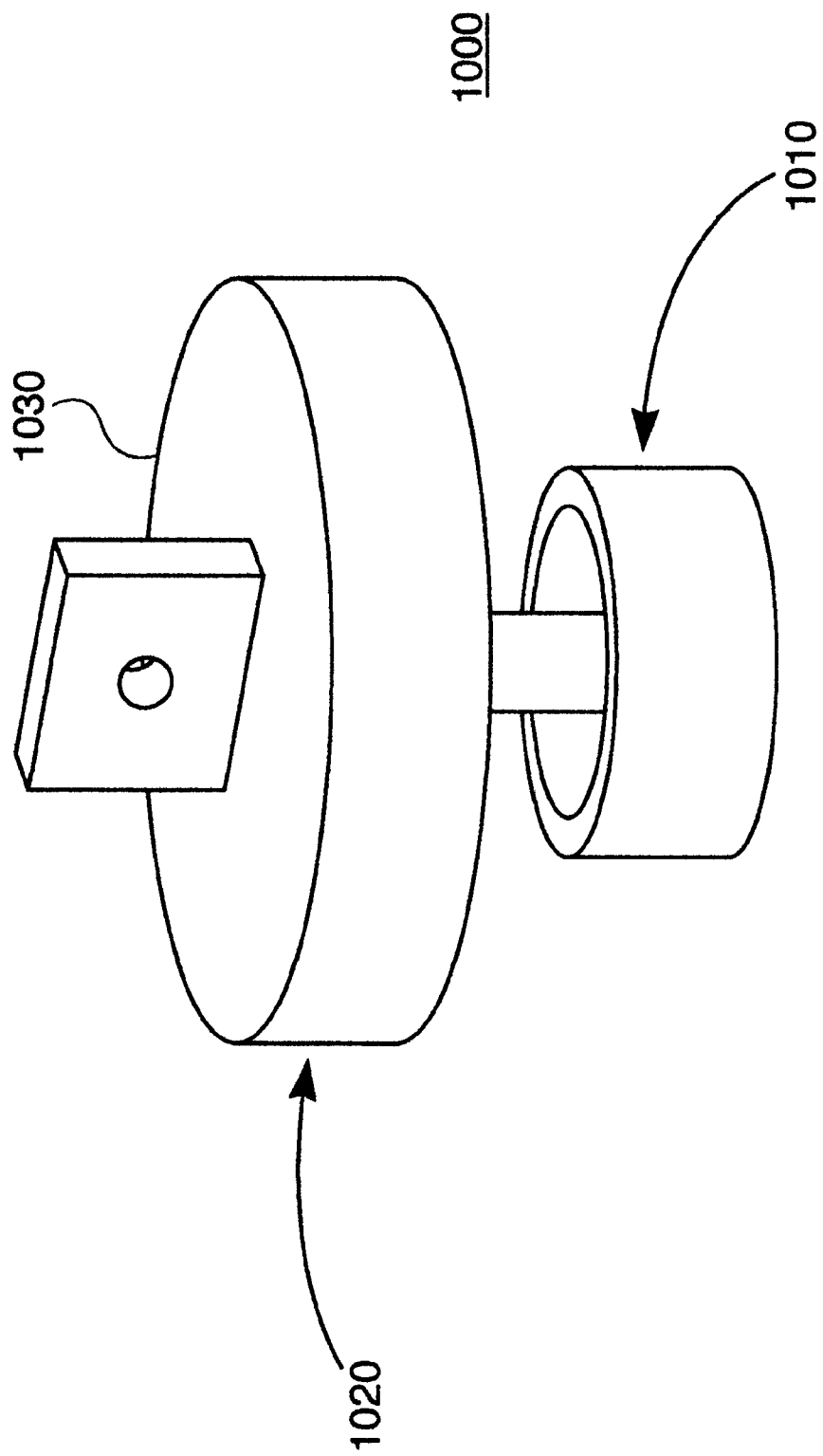
FIG. 10 is a perspective view of a bait holder for the trap holder of FIG. 9.

The use of a circular embodiment of FIG. 9 allows for use of a central bait station. FIG. 10 is a perspective view of a bait holder 1000 for trap holder 900 of FIG. 9. Opening 920 may be provided in trap holder 900. Opening 920 may be contiguous with each of the openings 910 in trap holder 900. Bait holder 1000 may be fitted into opening 920. Bait older 1000 may be fitted with cap portion 1020 which may be threaded-to engage with a corresponding portion of opening 920.

Once inserted into trap holder 900, bait holder 1000 will locate bait tray 1010 at a position where it may be accessed through each of openings 910. Bait tray 1010 may be used to hold a variety of bait types. As noted above, the inventor has discovered that water may be used as an effective bait for roaches and the like. Thus, a liquid or solid bait may be used in bait tray 1000.

In the embodiment of FIG. 9, individual traps may be installed and removed from openings 910. Bait tray may 1000 may be similarly removed to refresh bait on occasion. If bait tray 1000 is threaded into trap holder 900, handle 1030 may be used to lift the combined assembly. Other types of engagement between bait tray 1000 and trap holder 900 may be used. For example, a bayonet type joint may be used, or, in the alternative, a sliding engagement may be provided.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. An adhesive roach trap holder comprising:
    a first horizontal planar base member for supporting a plurality of adhesive roach traps;
    a plurality of pairs of stanchions formed on the first horizontal planar member, each adjacent pair of the plurality of pairs of stanchions defining a horizontally adjacent space for accepting a corresponding one of a plurality of adhesive roach traps placed between an adjacent pair of the plurality of stanchions, the plurality of adhesive roach traps being placed on the first horizontal planar member, horizontally adjacent to one another so as to form a continuous linear horizontal array of horizontally adjacent adhesive roach traps; and
    a plurality of adhesive roach traps, each of the plurality of adhesive roach traps being slidably placed between an adjacent pair of the plurality of stanchions so as to form a continuous linear array of horizontally adjacent adhesive roach traps, each adhesive roach trap being located to one horizontally adjacent side of an adjacent adhesive roach trap.

2. The adhesive roach trap holder of claim 1 wherein said plurality of stanchions form a plurality of vertical planar uprights on the horizontal planar member, each adjacent pair of vertical planar uprights of the plurality of vertical planar uprights receiving a substantially rectangular box-shaped adhesive roach trap therebetween.

3. The adhesive roach trap holder of claim 1, further comprising:
    a second horizontal planar member, attached to the plurality of stanchions so as to form a plurality of horizontally adjacent openings, each opening defined by a portion of the first horizontal planar member, a portion of the second horizontal planar member, and a pair of adjacent stanchions, each opening being sized to receive an adhesive roach trap shaped as a rectangular box.

4. The adhesive roach trap holder of claim 1, further comprising:
    means for attaching the adhesive roach trap holder to an adjacent holder to form a contiguous elongated horizontal linear adhesive roach trap holder assembly.

5. The adhesive roach trap holder of claim 4, wherein said means for attaching comprises:
    a hook portion of a hook-and-loop fastener attached to one stanchion of the adhesive roach trap holder at one end of the first horizontal planar member; and
    a loop portion of a hook-and-loop fastener attached to another stanchion of the adhesive roach trap holder at another end of the first horizontal planar member, for selectively engaging a hook portion of a hook-and-loop fastener of an adjacent adhesive roach trap holder.

6. A roach trap comprising:
    a first planar member;
    a plurality of stanchions defining a plurality of adjacent spaces:
    a second planar member, attached to the plurality of stanchions so as to form a plurality of adjacent openings, each opening defined by a portion of the first planar member, a portion of the second planar member, and a pair of adjacent stanchions;
    adhesive on the first planar member, for ensnaring roaches; and
    means for attaching the roach trap to an adjacent roach trap to form a contiguous elongated roach trap assembly,
    wherein said means for attaching comprises:
    a male dovetail joint formed on one stanchion of the roach trap at one end of the first planar member; and
    a female dovetail joint formed on another stanchion of the roach trap at another end of the first planar member, for selectively engaging a male dovetail joint member of an adjacent roach trap.

7. A roach trap holder comprising:
    a first Planar base member for supporting a plurality of roach traps;
    a plurality of stanchions formed on the first planar member, each adjacent pair of the plurality of stanchions defining a space for accepting a corresponding one of a plurality of roach traps placed between an adjacent pair of the plurality of stanchions, the traps being placed as the first planar member adjacent to one another so as to form a continuous linear array of roach traps;
    a plurality of roach traps, each of the plurality of roach traps being slidably placed between adjacent pairs of the plurality of stanchions so as to form a continuous linear array of adjacent roach traps, each roach trap being located to one side of an adjacent roach trap; and
    means for attaching the roach trap holder to an adjacent holder to form a contiguous elongated linear roach trap holder assembly,
    wherein said means for attaching comprises:
    a male dovetail joint formed on one stanchion of the roach trap holder at one end of the first planar member; and
    a female dovetail joint formed on another stanchion of the roach trap holder at another end of the first planar member, for selectively engaging a male dovetail joint member of an adjacent roach trap holder.

* * * * *